S. W. PUTNAM.
METAL-DRILLING MACHINE.
No. 170,591. Patented Nov. 30, 1875.
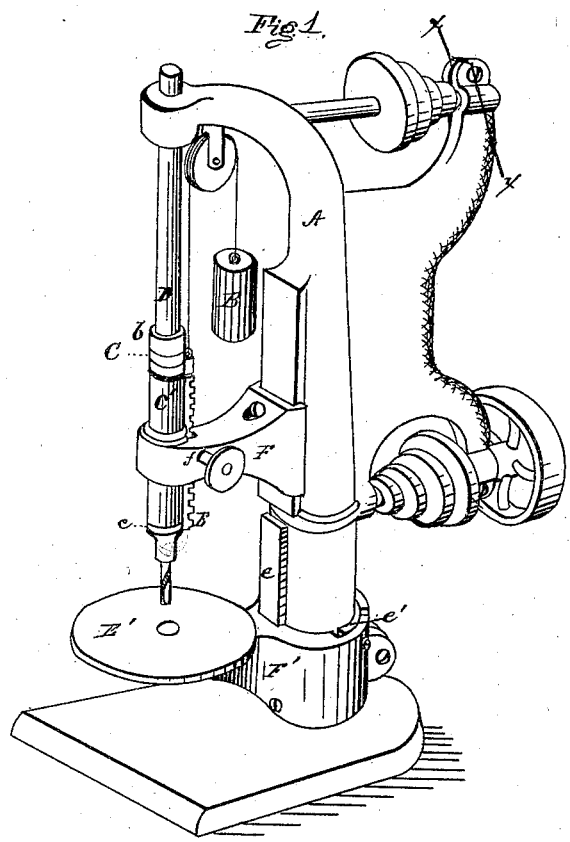
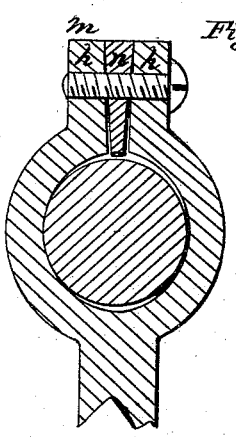

UNITED STATES PATENT OFFICE.

SALMON W. PUTNAM, OF FITCHBURG, MASSACHUSETTS.

IMPROVEMENT IN METAL-DRILLING MACHINES.

Specification forming part of Letters Patent No. 170,591, dated November 30, 1875; application filed October 18, 1873.

*To all whom it may concern:*

Be it known that I, S. W. PUTNAM, of Fitchburg, Massachusetts, have invented certain new and useful Improvements in Upright Drills, of which the following is a clear, full, and exact description, reference being had to the accompanying drawings, making a part of this specification, in which—

Figure 1 represents a perspective view of a drill with my improvement attached; Fig. 2, a cross-section through the line *x x*.

To enable others skilled in the art to make and use my invention, I will proceed to describe the exact manner in which I have carried it out.

In the drawings, A represents the upright frame, constructed hollow for the reception of the weight B, although in the drawing the weight, for the sake of convenience, is shown suspended outside of the hollow frame A.

The weight B, which I make sufficiently heavy to slightly overbalance the weight of the spindle-socket and drill, but in no case required or designed to balance the head F, is connected by a cord or chain to a loose collar, C, on the spindle D, the collar bearing upward against the check-nut *b* on said spindle.

The sleeve or bearing piece C' is provided with a rack, E, by means of which it can be raised and lowered by a cog-gear on the shaft *f*, which is supported in suitable bearings in the drill-head F, which is fitted to the upright frame, and is made adjustable, vertically, by rack and pinion, or any other suitable means, and is secured in the desired position by a screw or otherwise.

Below the drill-spindle bearing C' I place a collar, *c*, on the spindle, to receive the force of the pressure when the spindle is in operation, while at the same time the whole of the weight B is thrown upward against the check-nut *b*, thus placing the spindle between two forces, the one bearing it down to its work and the other bearing it up sufficiently to guard against the possibility of the drill dropping when striking a seam or passing through the work, by reason of any backlash.

I am aware that balance-weights have been connected to upright drills to avoid a change in the balance when the drill and its bearing and drill-head are raised or lowered, but this is not my invention, as I attach my drill-head rigidly to the upright frame A, and balance only the spindle-socket and drill, to prevent the latter from dropping.

The drilling-table E' is attached to a supporting-arm, F', which admits of being revolved on the main column, and is adjusted vertically by means of a rack and pinion, or any other well-known device.

It is well known that the weight of the work, as well as the weight of the arm and table, causes the arm-bearing to wear by its unequal weight and pressure against the column, and allow the table to sag from its true relative position to the drilling-spindle. To avoid this difficulty I have provided gibs and screws suitably fitted to the front lower side, and in some cases in the upper back side of the arm-bearing, in such a manner as to receive the greatest amount of wearage, and by their adjustment cause the table to return to its original position.

In Fig. 1, the gib *e* is adjustable within the arm-bearing, and can readily be moved up to compensate for the wear on the front lower side, while *e'* can be as readily adjusted at the upper back side, and thus keep the drilling-table E' in its proper position, without which the work must necessarily be imperfect.

The outside boxes and bearings for the driving or cone shafts have usually been made of the required size through solid metal, or have been "babbitted" or enlarged sufficiently to be bushed. These bearings have also been made in halves and attached to the frame by bolts and screws. It is evident that in the former case it would be impossible to adjust the box as it wears, without rebabbitting or rebushing, which is not practicable, unless there be a great amount of wear and play, while in the latter case the boxes require reducing by filing or planing to compensate for the wear, and when put together after such filing the boxes are imperfect, as the holes or bearings are no longer a circle, but tending to an oval form. To overcome this difficulty I construct split boxes or bearings *m*, (see Fig. 2,) which may be made of solid metal, or lined with babbitt, or bushed. These boxes are not only simple in construction, but admit of the slightest and most delicate adjustment, and have a reasonable amount of range.

The space that intervenes between the projections or horns h h is filled with the wooden or other flexible wedge n to protect the bearing from grit or dirt of any kind. As the wedge is an absorbent, it is evident that, as it becomes compressed between the projections h h, it will act as an automatic lubricator, every additional compression of the projections causing an additional percolation of the oil through the wedge n to the shaft.

Having thus described my invention, what I claim as new, and desire to secure by Letters Patent, is—

1. In an upright drill the combination, with the spindle, of a balancing device, consisting of the collar C and weight B, connected by a cord, the collar c and nut b, whereby the drill is prevented from dropping, substantially as above described.

2. The drilling-table E', provided with the supporting-arm F', in combination with the frame A and gibs e e', substantially as and for the purpose set forth.

3. The split boxes m, in combination with the flexible wedge n, substantially as and for the purpose set forth.

SALMON W. PUTNAM.

Witnesses:
GEO. E. PUTNAM,
CHAS. B. GATES.